(12) United States Patent
Huber

(10) Patent No.: US 6,416,006 B1
(45) Date of Patent: Jul. 9, 2002

(54) BELT RETRACTOR FOR A VEHICLE SAFETY BELT

(75) Inventor: Andreas Huber, Durlangen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/455,206

(22) Filed: Dec. 6, 1999

(30) Foreign Application Priority Data

Dec. 7, 1998 (DE) ..................... 298 21 801 U

(51) Int. Cl.⁷ .............................................. B65H 75/48
(52) U.S. Cl. ................................................. 242/379.1
(58) Field of Search .................. 242/379.1; 280/805, 280/806; 297/470, 471, 472

(56) References Cited

U.S. PATENT DOCUMENTS

| | | | | |
|---|---|---|---|---|
| 5,607,118 A | * | 3/1997 | Dybro et al. | 242/379.1 |
| 5,613,647 A | * | 3/1997 | Dybro et al. | 242/376 |
| 5,618,006 A | * | 4/1997 | Sayles | 242/379.1 |
| 5,626,306 A | * | 5/1997 | Miller, III et al. | 242/379.1 |
| 5,671,894 A | * | 9/1997 | Dybro et al. | 242/374 |
| 5,785,269 A | * | 7/1998 | Miller, III et al. | 242/379.1 |
| 5,820,056 A | * | 10/1998 | Dybro et al. | 242/374 |
| 5,842,657 A | * | 12/1998 | Modzelewski | 242/374 |
| 5,899,402 A | * | 5/1999 | Koning | 242/379.1 |
| 5,961,060 A | * | 10/1999 | Brambilla et al. | 242/379.1 |

FOREIGN PATENT DOCUMENTS

| | | | | |
|---|---|---|---|---|
| DE | 7306883 | | 5/1973 | B60R/22/28 |
| DE | 2727470 | A1 | 1/1979 | A62B/35/02 |
| DE | DE-2727470 A1 | * | 1/1979 | A62B/35/02 |
| DE | 4331027 | A1 | 3/1995 | B60R/22/34 |
| DE | DE-4331027 A1 | * | 3/1995 | B60R/22/34 |
| DE | 4436810 | C2 | 4/1996 | B60R/22/28 |
| DE | 9544918 | A1 | 6/1997 | B60R/22/28 |
| DE | 9727919 | A1 | 11/1998 | B60R/22/28 |

* cited by examiner

Primary Examiner—Donald P. Walsh
Assistant Examiner—Mark J. Beauchaine
(74) Attorney, Agent, or Firm—Tarolli, Sundheim, Covell, Tummino & Sazbo L.L.P.

(57) ABSTRACT

A belt retractor for a vehicle safety belt comprises a belt spool, a locking catch, at least one locking toothing into which the locking catch can be caused to engage, and at least one force limiter which allows a rotation of the belt spool in an unwinding direction of the safety belt against a determined torque. In addition, a clutch is provided Which cooperates with the force limiter in order to alter the determined torque.

9 Claims, 5 Drawing Sheets

BELT RETRACTOR FOR A VEHICLE SAFETY BELT

TECHNICAL FIELD

The invention relates to a belt retractor for a vehicle safety belt.

BACKGROUND OF THE INVENTION

Conventional belt retractors comprise a belt spool, at least one locking toothing into which a locking catch can be caused to engage, at least one force limiter which can make possible a rotation of said belt spool in an unwinding direction of a belt webbing.

The force-limiting device serves to make it possible, with a belt spool which in itself is blocked, that a certain amount of belt webbing can be unwound from the belt spool against a determined torque acting as resistance. In this way, an additional way is made available for the deceleration of a vehicle occupant, whereby the maximum traction acting in the belt webbing can be limited to an extent at which no injuries to the vehicle occupant occur. A switchable clutch may be provided in order to adapt the characteristic of belt webbing unwinding force versus unwound belt webbing to the respective conditions. For example, with a heavy vehicle occupant it is desirable that a comparatively high force is necessary for belt webbing unwinding, whereas with a light vehicle occupant the unwinding of the belt webbing must already be possible with a smaller traction, so that the force-limiting effect occurs and injuries to the vehicle occupant are prevented. For this purpose, hitherto belt retractors have been known, in which a torsion rod is used as force limiter, which consists of several individual parts. The clutch makes it possible to connect the individual parts of the torsion rod in parallel so that the characteristic of resistant torque or belt webbing unwinding force versus unwound belt webbing can be altered. Independently of the respective engagement state of the clutch, however, a part of the force limiter is effective in any case.

BRIEF SUMMARY OF THE INVENTION

The invention provides a belt retractor for a vehicle safety belt, which comprises a belt spool, a locking catch, at least one locking toothing into which the locking catch can be caused to engage, and at least one force limiter which allows a rotation of the belt spool in an unwinding direction of the safety belt against a determined torque. In addition, a clutch is provided which cooperates with the force limiter in order to alter the determined torque. This gives greater freedom as regards the characteristic of belt webbing unwinding force versus unwound belt webbing using various constructions.

If only a single force limiter is present, which is deactivated with an actuated clutch, provision is made that the locking toothing is constructed on a locking disc which is connected non-rotatably with the belt spool when the clutch is actuated. In this design, the belt retractor acts like a conventional belt retractor without force limiter, when the clutch is actuated, the belt spool is therefore blocked by means of the locking toothing and an unwinding of the belt webbing from the belt spool is not possible. This type of operation can be used in particular after a first impact of the vehicle. With the so-called primary impact of the vehicle, the restraining effect for the vehicle occupant is usually provided both from the belt retractor with active force limiter and also from a gas bag. The force limiter is coordinated with the gas bag such that as uniform and gentle a restraining effect as possible is achieved. Of course, if a secondary impact occurs, the gas bag is no longer effective. If in this case the force limiter of the belt retractor were still active, an excessively great forward movement of the vehicle occupant would be possible, which could finally lead to contact with parts of the interior of the vehicle. For this reason, it is desirable that the belt retractor operates in a secondary impact in a conventional manner without a force limiter, i.e. the belt spool is blocked so that the belt webbing can not be unwound from it further. It is basically conceivable to switch the clutch mechanically, so that the force limiter in each case is deactivated and the belt spool can be completely blocked. This possibility is relevant for the case where the gas bag present in a vehicle is deactivated from the outset for every case, when for example the vehicle occupant sees an undesired potential for danger in such a gas bag. Because then the gas bag is no longer available for restraining the vehicle occupant, the forward movement of the vehicle occupant must be limited, so that the force limiter can not be active.

The design according to the invention also makes it possible to provide two force limiters which in the initial state with non-actuated clutch are connected in parallel and one of which is deactivated by actuating the clutch. In the initial state, the force necessary for unwinding belt webbing from the belt spool is determined by the sum of the holding moments provided by the two force limiters. If, on the other hand, the clutch was actuated, the characteristic results from the holding force provided by the remaining force limiter. The clutch can be actuated for example as a function of the weight of the corresponding vehicle occupant. If a suitable sensor arrangement detects, for example by means of pressure sensors in the vehicle seat, that the corresponding vehicle occupant has a low weight, then the clutch is actuated, so that only a single force limiter is active. In this case, an unwinding of belt webbing from the belt spool is already possible with smaller belt webbing forces.

According to a preferred embodiment of the invention, provision is made that the clutch has a carrier which is provided with carrier plates, which engage into a suitably shaped mounting of an output element, so that a form-fitting connection is achieved, and that a piston is provided, which in the non-actuated position supports the carrier plates, so that the carrier and the output element are connected non-rotatably with each other, and which in the actuated position frees the carrier plates, so that the connection between the carrier and the output element is released above a predetermined moment of torsion. This design leads to a particularly compact clutch which can be actuated in a reliable manner.

Preferably provision is made that the piston closes a pressure chamber in which a pyrotechnic charge is arranged, which on activation moves the piston from the non-actuated position into the actuated position. In this way, it is ensured that the clutch can be transferred reliably into the actuated position under all circumstances.

Basically all types of force limiters come into consideration As force limiters, for example a torsion rod or a band extraction device, in which a steel band guided in a guideway can be drawn out therefrom, whereby the holding force is provided owing to the friction between the steel band and the guideway.

Advantageous developments of the invention will be apparent from the sub-claims.

DETAILED DESCRIPTION OF PREFERRED EMBODIMENTS

Figure 1:
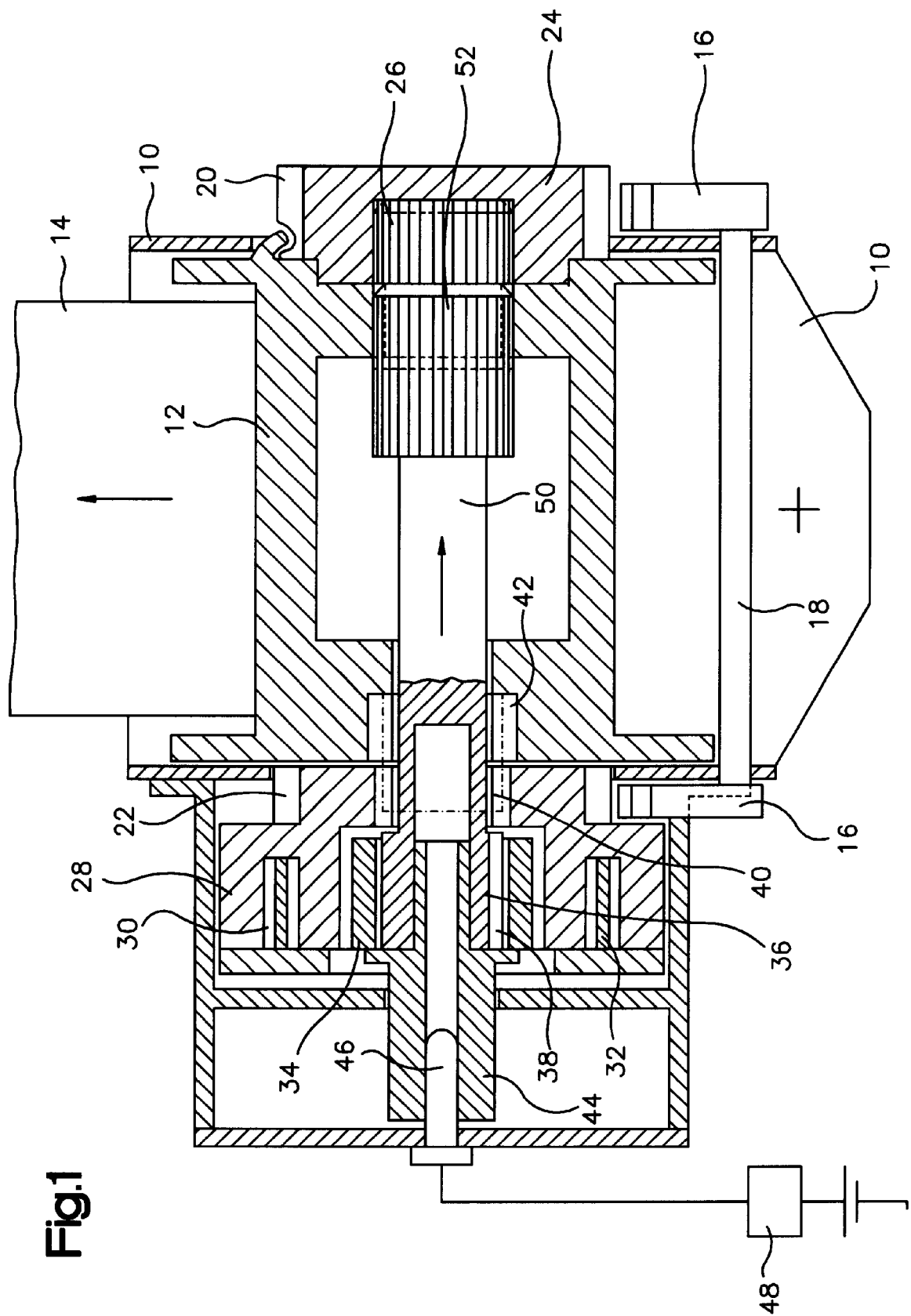
FIG. 1 shows in a diagrammatic cross-section a belt retractor according to the invention in accordance with a first embodiment.

In FIG. 1 a belt retractor is shown according to a first embodiment of the invention. It contains a belt spool 12 rotatably mounted in a frame 10, onto which belt spool 12 a belt webbing 14 is wound.

Two locking catches 16 are mounted pivotally in the frame 10, which are connected with each other non-rotatably by an axle 18. The two locking catches 16 are activated in a manner known per se by a suitable trigger mechanism which can cause them to engage, in a vehicle-sensitive or belt webbing-sensitive manner, into locking toothings 20, 22. The locking toothing 20 is constructed on a locking disc 24 which is rotatably mounted on the right-hand side of the belt spool 12 with regard to FIG. 1 and is provided with a splined profile 26.

The locking toothing 22 is constructed on a housing 28 of a force-limiting device which is arranged at the left-hand end of the belt spool 12 with regard to FIG. 1. This force-limiting device has a channel 30 in the housing 28, in which a steel band 32 is arranged. The steel band 32 is connected at one end with a hub 34, which is arranged concentrically with the housing 28. Expressed in simplified form, with a rotation of the hub 34 relative to the housing 28, the steel band 32 is drawn out from the channel 30, overcoming a frictional force. This frictional force can be adjusted in the desired manner by suitable construction of the channel, by the curvature of guideways arranged in this channel and also by the design of the steel band. As regards details of this force-limiting device, reference is to be made to the German Utility Model 298 16 280, which is referred to here expressly.

Inside the hub 34 a piston 36 is arranged, which is provided on its exterior with a splined profile 38. The splined profile 38 engages non-rotatably into a complementary splined profile of the hub 34. In addition, the housing 28 and also the belt spool 12 are provided with splined profiles 40, 42 complementary to the splined profile 38.

The piston 36 has a hollow interior, into which a pressure chamber part 44 projects. Inside the pressure chamber part 44 a pyrotechnic charge 46 is arranged, which can be ignited by a sensor- and ignition unit 48.

On the side facing away from the pyrotechnic charge 46, the piston 36 is provided with an actuating protrusion 50, which is provided with a splined profile 52 at its free end. The splined profile 52 is complementary to the splined profile 26 of the locking disc 24 and engages in addition into a complementary splined profile at the right-hand end of the belt spool.

In FIG. 1 the rest- and initial position of the piston 36 and of the actuating protrusion 50 are shown. In this position of rest, the splined profile 38 of the piston 36 engages into the complementary splined profile of the hub 34, and the splined profile 52 of the actuating protrusion 50 engages into the splined profile at the right-hand end of the belt spool 12. The splined profile 38 of the piston 36, however, does not engage into the splined profiles 40 and 42 of the housing 28 and of the left-hand end of the belt spool, and the splined profile 52 does not engage into the splined profile 26 of the locking disc 24.

When the locking catches 16 are activated, the following mode of operation results: The locking toothings 20, 22 are blocked by the locking catches 16. As the locking disc 24 is freely rotatable relative to the belt spool, however, no force can be transferred to the belt spool on the right-hand side. When the belt webbing 14 is pulled in the direction indicated by the arrow, a corresponding moment of rotation is transferred to the piston 36 via the splined profile 52 and the actuating protrusion 50, which then in turn is transferred to the hub 34 via the splined profile 38. The hub 34 is connected via the steel band 32 with the housing 28, which is held non-rotatably by means of the locking toothing 22 and the locking catch 16. Only when the moment of rotation or the determined torque transferred via the belt spool onto the hub 34 exceeds a value at which the holding force of the steel band is exceeded does a relative rotation of the hub 34 in relation to the housing 28 occur, so that belt webbing can be unwound from the belt spool 12. A force-limiting function is thus realized.

Another mode of operation results when the clutch is actuated. For this purpose, the pyrotechnic charge 46 is ignited. Then such a pressure occurs in the pressure chamber part 44 that the piston 36 is moved from the position shown in FIG. 1 to the right into a position in which the splined profile 38 engages into the splined profiles 40 and 42 and the splined profile 52 engages into the splined profile 26. This position of the piston is shown in dot-and-dash lines in FIG. 1. In this actuated position, the following mode of operation results: If a force is exerted onto the belt spool 12 via the belt webbing 14, the resulting moment of rotation is introduced from the right-hand side of the belt spool into the splined profile 52 and from the latter directly into the splined profile 26 of the locking disc 24. The locking disc 24, however, is blocked by means of the locking catch 16. The belt spool is therefore directly blocked, without a force limiter being able to become active.

Figure 6:
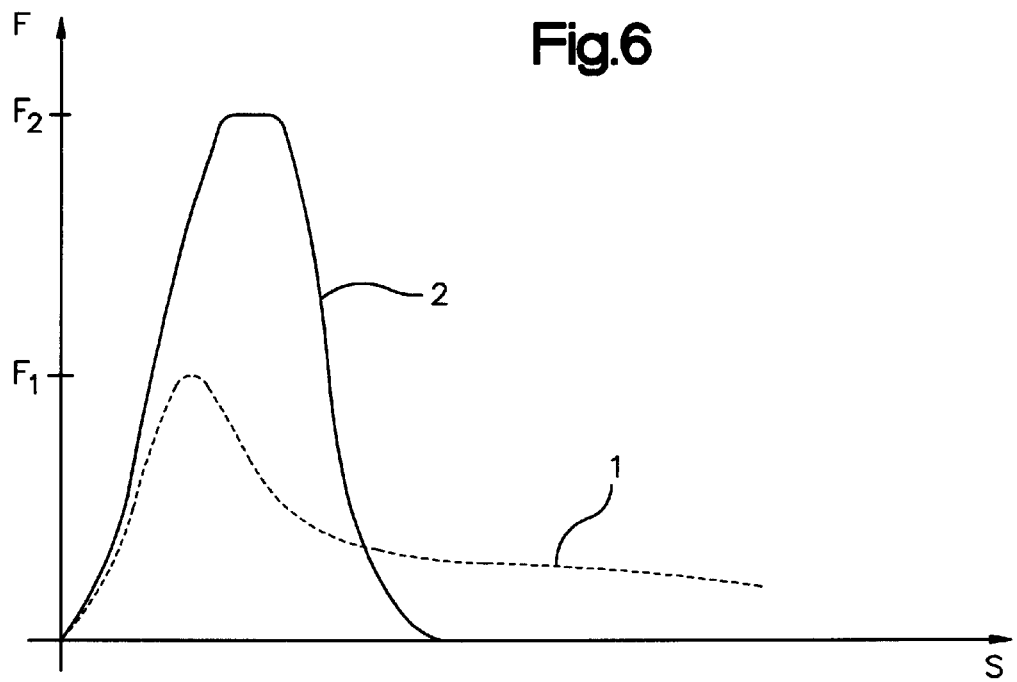
FIG. 6 shows a diagram of belt webbing unwinding force versus unwound belt webbing for the belt retractor according to the first embodiment.

In FIG. 6 the resulting characteristics of belt webbing unwinding force F versus unwound belt webbing s are shown. In the position with non-actuated clutch, in which the force limiter is active, the curve 1 results, in which the maximum acting belt webbing force is limited to a value $F_1$. As soon as this value of belt webbing unwinding force is reached, the holding force of the steel band 32 is overcome, so that a relative rotation between the carrier 34 and the housing 28 and consequently a release of belt webbing occurs. If, on the other hand, the clutch is actuated, the characteristic 2 results, in which the forces acting in the belt webbing can reach a very much higher value. This value is finally given by the breaking strength of the belt retractor.

In FIGS. 2 to 5, the essential components of a belt retractor according to a second embodiment are shown diagrammatically. Here, also, a clutch provided with a pyrotechnic charge 46 and a piston 36 are used.

The belt retractor according to the second embodiment differs from that of the first embodiment substantially in that inside the belt spool 12 a torsion rod 60 is arranged. At the right-hand end with respect to FIG. 3 the locking disc 24 is arranged with the locking toothing 20, the locking disc 24 being provided with a splined profile 26 which is connected non-rotatably with a splined profile 62 of the torsion rod.

The opposite end is provided with a splined profile 64 which is connected non-rotatably with the splined profile 42 of the belt spool 12. On the splined profile 42 in addition a carrier 66 (see also FIGS. 4 and 5) is arranged non-rotatably, which is provided with carrier plates 68. The carrier plates 68 have an outer contour such that together they form a splined shaft profile. This splined shaft profile engages into a complementary splined hub profile 70, which is constructed inside the hub 34. Inside the carrier 66, the piston 36 known from the first embodiment is arranged, which lies with its outer surface against the inner surface of the carrier plates 68.

Figure 2:
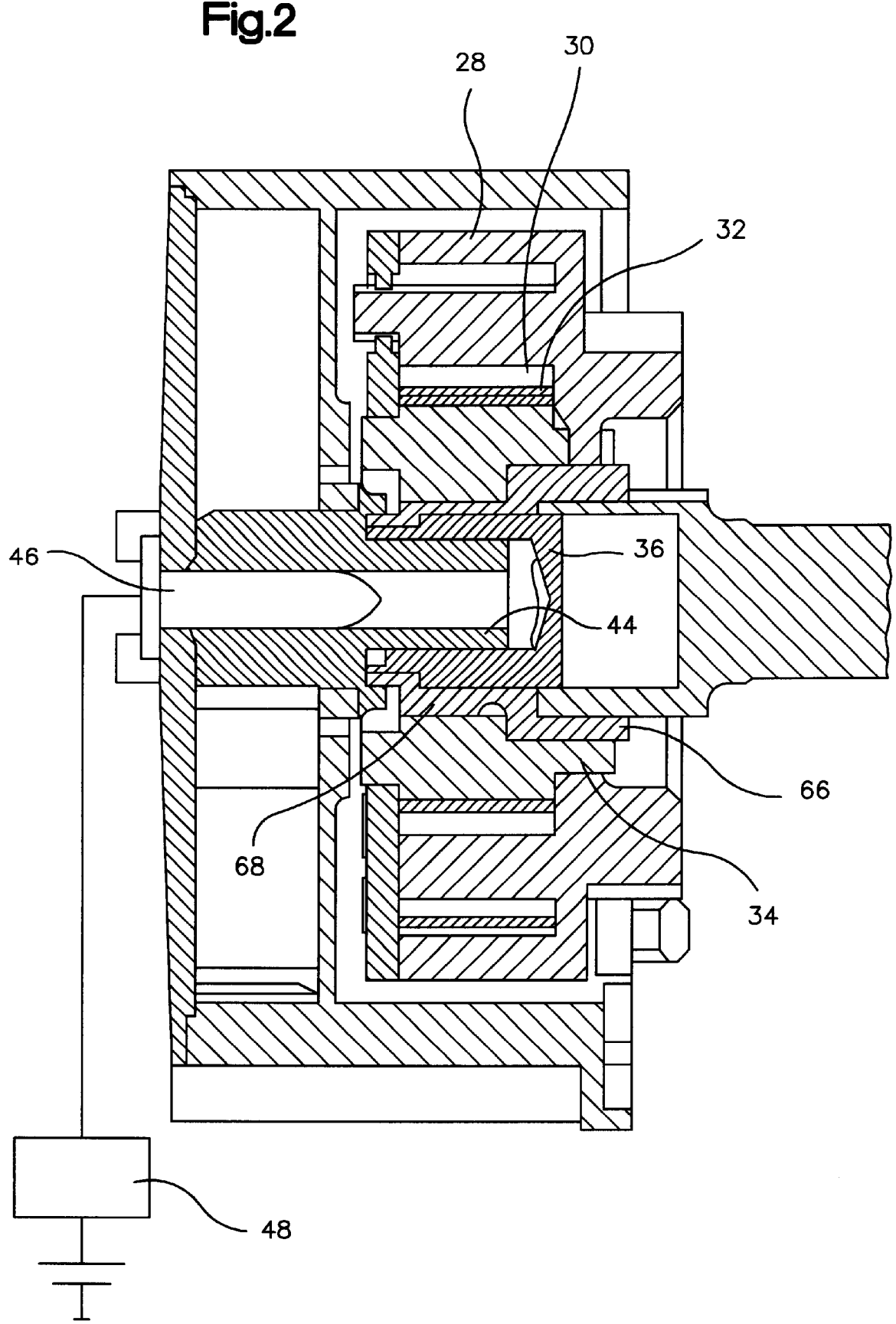
FIG. 2 shows in a diagrammatic sectional view the force limitation mechanism in a belt retractor according to the invention in accordance with a second embodiment.
Figure 3:
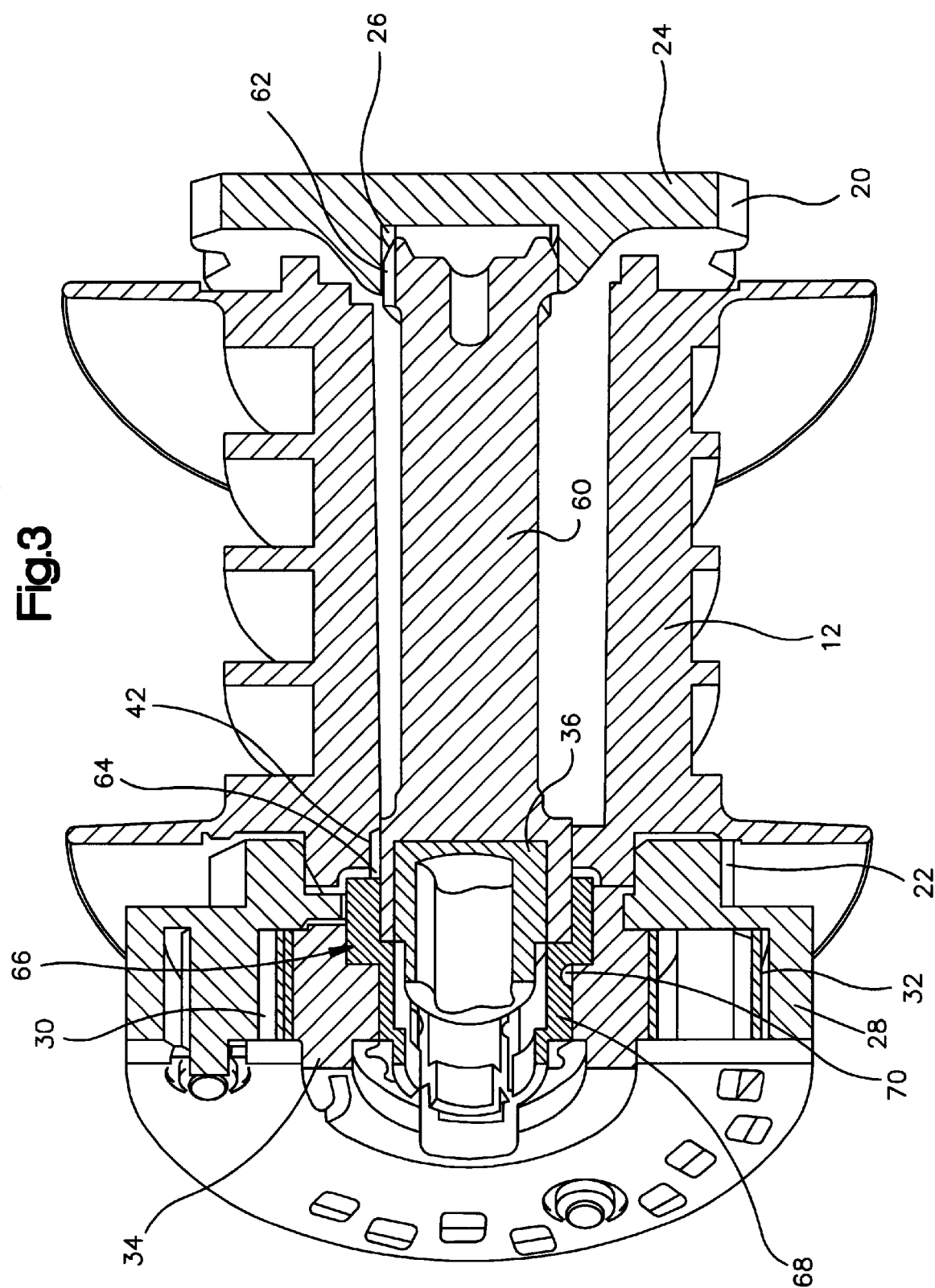
FIG. 3 shows in a perspective sectional view a part of a belt retractor according to the invention in accordance with the second embodiment.
Figure 4:
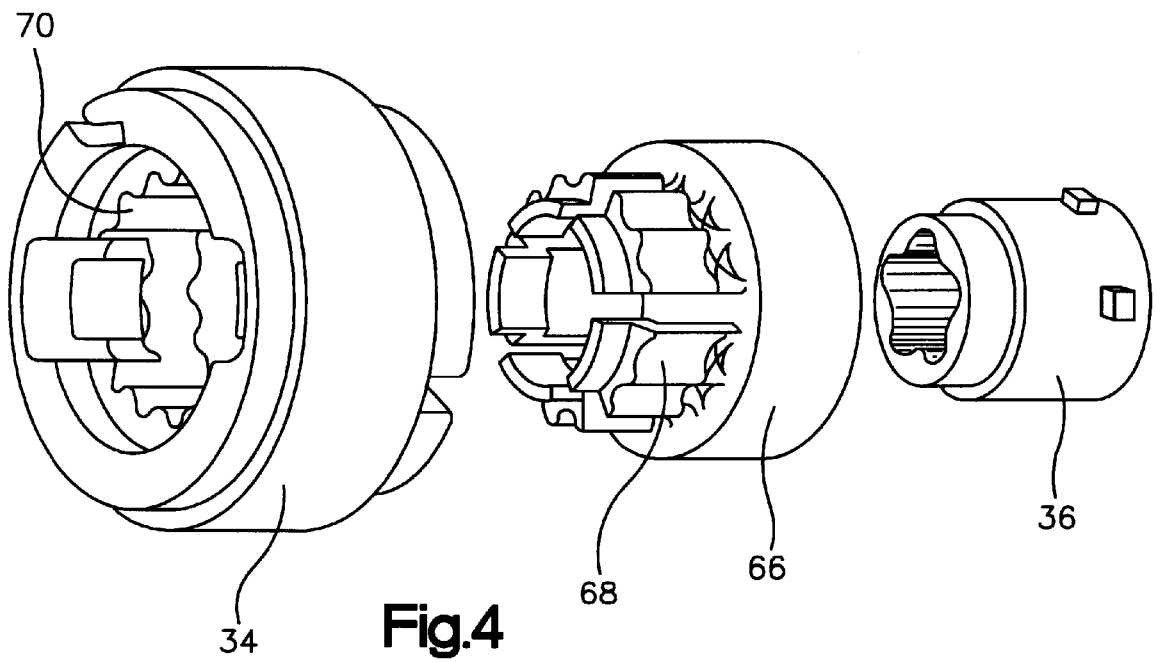
FIG. 4 shows in a perspective exploded view the components of the clutch contained in the belt retractor of FIG. 1.
Figure 5:
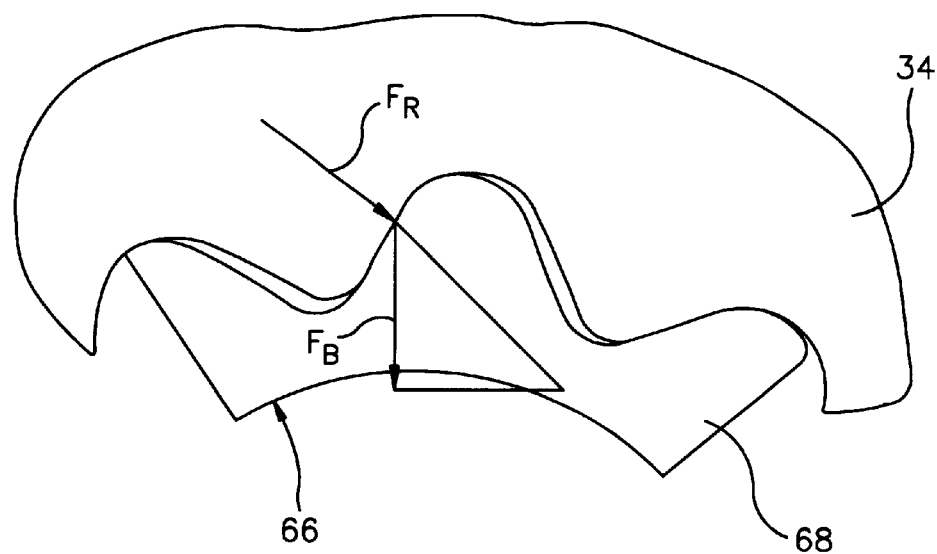
FIG. 5 shows in an enlarged broken-off view a part of the clutch of FIG. 2.

The initial position with non-actuated clutch is shown in FIG. 2. The following mode of operation can be seen therein: When the locking catches 16 engage into the toothings 20, 22, on the one hand via the locking disc 24 the right-hand end of the torsion rod 60 is held non-rotatably and on the other hand via the locking toothing 22 the housing 28 of the force limiter consisting of the hub 34, the steel band 32 and the housing 28. When the belt spool 12 is acted upon via the belt webbing 14 in the unwinding direction of the belt webbing, the resulting moment of rotation is introduced, via the splined profile 42 of the belt spool 12 and the splined profile 64 of the torsion rod 60, both into the torsion rod 60 and also into the carrier 66. The belt spool can then be rotated in the unwinding direction of the belt webbing when the moment of rotation acting on it is greater than the holding moment of rotation provided by the torsion rod 60 and the holding moment of rotation provided by the steel band 32 together with the hub 34 and the housing 28. The two force limiters are therefore connected in parallel.

To actuate the clutch, the pyrotechnic charge 46 is ignited. The pressure thereby arising moves the piston 36 from the left-hand position shown in FIG. 2 into the right-hand position shown in FIG. 3. In this state, the outer surface of the piston 36 is no longer able to support the carrier plates 68 on the inner surface.

When in this state with actuated clutch a moment of rotation is exerted onto the belt spool, this is introduced in an identical manner to that with a non-actuated clutch both into the torsion rod 60 and also into the carrier 66. Since now, however, the carrier plates 68 are no longer supported, these—in trying to rotate the hub 34—are pressed inwards through the resulting force $F_R$ (see FIG. 5) and a bending force $F_B$ resulting therefrom. Since at the foot of the carrier plates a nominal fracture site 70 is formed, the carrier plates break off and no moment of rotation is transferred to the hub 34. Hence the moment of rotation counteracting a rotation of the belt spool 12 is provided exclusively from the torsion rod 60, the second force limiter is deactivated.

Figure 7:
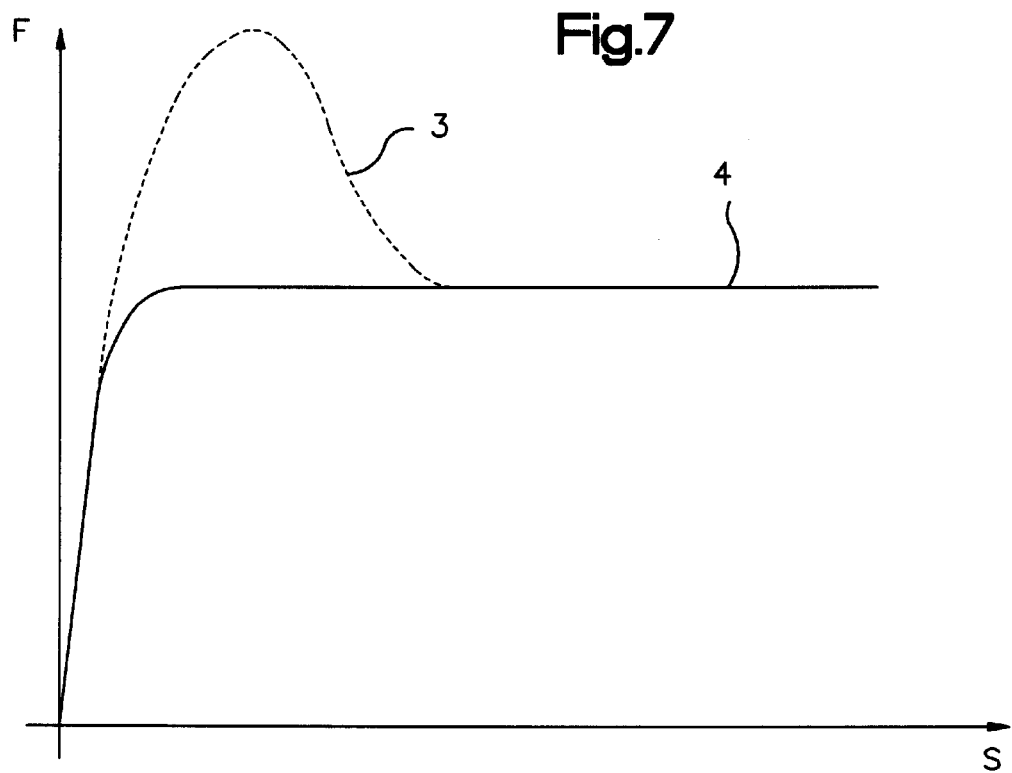
FIG. 7 shows a diagram of belt webbing unwinding force versus unwound belt webbing for the belt retractor according to the second embodiment.

In FIG. 7 the resulting characteristics of belt webbing unwinding force F versus unwound belt webbing s are shown. In the position with non-actuated clutch, in which the two force limiters are connected in parallel, the characteristic 3 is produced, in which the holding force provided by each individual force limiting device is added. In the position with actuated clutch, the curve 4 is produced, which is determined exclusively by the holding force provided by the torsion rod 60.

I claim:

1. A belt retractor for a vehicle safety belt, comprising a belt spool, a locking catch, at least one locking toothing into which said locking catch can be caused to engage, at least one force limiter which allows a rotation of said belt spool in an unwinding direction of said safety belt against a determined torque, and a clutch cooperating with said at least one force limiter in order to alter said determined torque.

2. A belt retractor for a vehicle safety belt, comprising a belt spool, a locking catch, at least one locking toothing into which said locking catch can be caused to engage, at least one force limiter which allows a rotation of said belt spool in an unwinding direction of said safety belt against a determined torque, and a clutch cooperating with said at least one force limiter in order to alter said determined torque, wherein said clutch comprises an output element and a carrier, said carrier being provided with carrier plates and said output element being provided with an accommodation for said carrier plates so that a positive, form-locking connection between said carrier plates and said output element can be formed, and wherein a piston is provided which in a non-actuated position supports said carrier plates so that said carrier and said output element are connected non-rotatably with each other, and which in an actuated position frees said carrier plates so that a connection between said carrier and said output element is released above a predetermined torque.

3. The belt retractor of claim 2, wherein a pressure chamber is formed which is closed by said piston, said pressure chamber being provided with a pyrotechnic charge which on activation moves said piston from said non-actuated position into said actuated position.

4. A belt retractor for a vehicle safety belt, comprising a belt spool, a locking catch, at least one locking toothing into which said locking catch can be caused to engage, at least one force limiter which allows a rotation of said belt spool in an unwinding direction of said safety belt against a determined torque, and a clutch cooperating with said at least one force limiter in order to alter said determined torque, wherein a single force limiter is provided which is deactivated when said clutch is actuated, and wherein said locking toothing is constructed on a locking disc which is connected non-rotatably with said belt spool when said clutch is actuated.

5. The belt retractor of claim 4, wherein said single force limiter is a band extraction device.

6. The belt retractor of claim 5, wherein an actuating protrusion is provided which is connected with a piston, said protrusion being provided with a toothing by means of which said locking disc can be connected non-rotatably with said belt spool.

7. A belt retractor for a vehicle safety belt, comprising a belt spool, a locking catch, at least one locking toothing into which said locking catch can be caused to engage, at least one force limiter which allows a rotation of said belt spool in an unwinding direction of said safety belt against a determined torque, and a clutch cooperating with said at least one force limiter in order to alter said determined torque, wherein two of said force limiters are present, one of said force limiters being deactivated when said clutch is actuated.

8. The belt retractor of claim 7, wherein one of said force limiters is a torsion rod and the other of said force limiters is a band extraction device.

9. The belt retractor of claim 8, wherein said band extraction device is deactivated when said clutch is actuated.

* * * * *